Nov. 3, 1925.
P. G. LUBER
1,560,067
CAN OPENER
Filed May 24, 1924
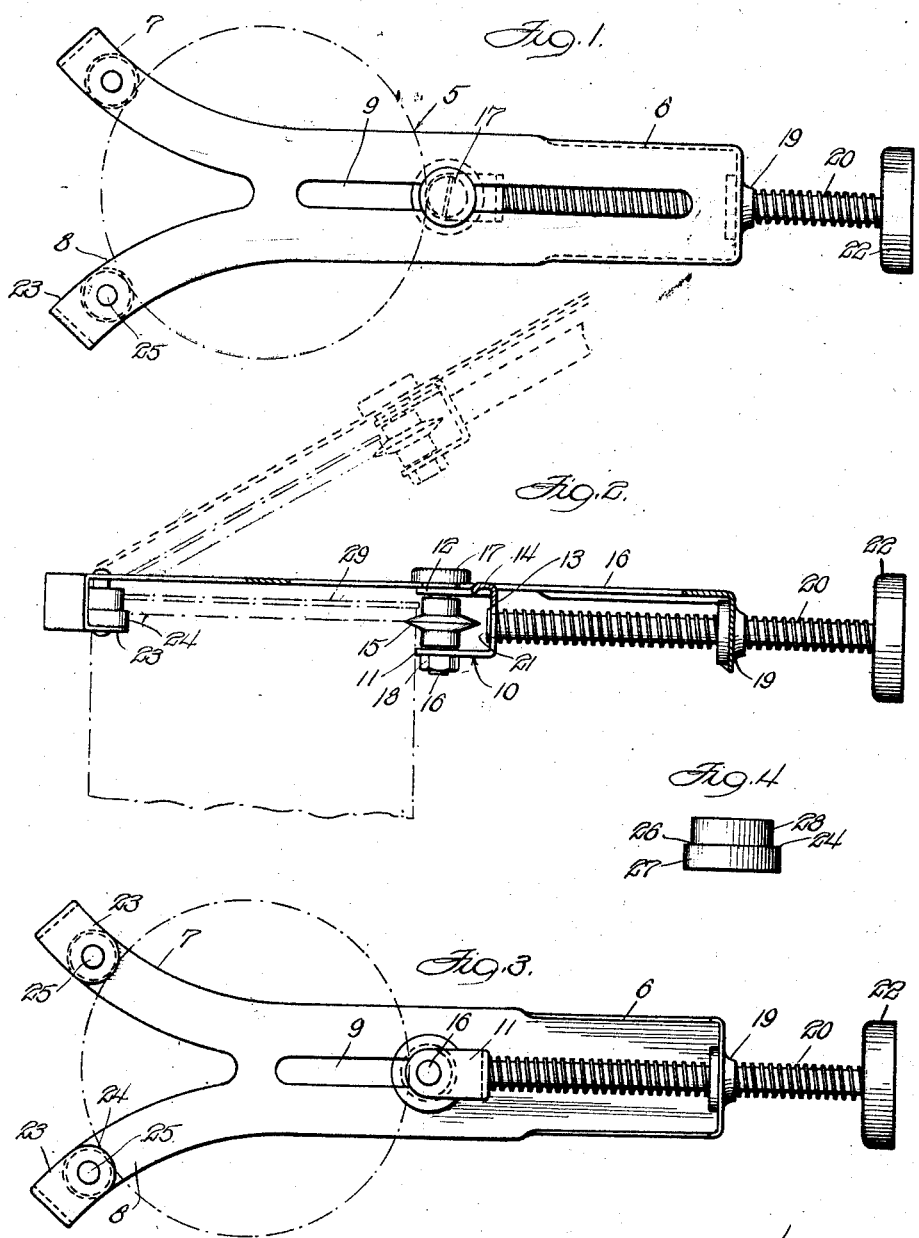
Inventor:
PHILIP G. LUBER Patented Nov. 3, 1925.

1,560,067

UNITED STATES PATENT OFFICE.

PHILIP G. LUBER, OF CHICAGO, ILLINOIS.

CAN OPENER.

Application filed May 24, 1924. Serial No. 715,582.

*To all whom it may concern:*

Be it known that I, PHILIP G. LUBER, a citizen of the United States, residing at Chicago, in the county of Cook and State of Illinois, have invented certain new and useful Improvements in Can Openers, of which the following is a specification.

The invention relates to can openers.

One of the objects of the invention is to provide a convenient easily operable device which will remove the entire head or end of the can to leave no obstructions to prevent entire discharge of its contents.

A further object is to provide a device of this character which may be made at such low production cost that it may be sold at a price that will justify its purchase by every householder.

Another object is to provide means for quickly adjusting the device so that it may be used readily on cans of varying diameters.

Other objects, advantages and benefits will become readily apparent from a consideration of the following description when taken in conjunction with the drawing, wherein:—

Fig. 1 is a plan view of the device.

Fig. 2 is a central section showing parts in elevation.

Fig. 3 is a bottom plan view.

Fig. 4 is a perspective view of one of the rollers.

In all the views the same reference characters indicate similar parts.

The frame 5 is made preferably of sheet metal providing a handle part 6 and two diverging arms 7 and 8. The handle part contains a slot 9 in which a knife carrier 10 is longitudinally movable.

The slot is located in a median vertical plane between the ends of the arms 7 and 8.

The knife carrier consists of a U-shape holder having side walls 11 and 12 and an intermediate wall 13. The wall 12 may have a hump 14 which serves as a guide as it slides in the slot 9. A rotatable knife 15 is held in place between the walls 11 and 12 by a screw 16 which has an enlarged head 17 that rides above the slot 9 to prevent undesirable displacement of the knife holder. The screw passes thru the knife and furnishes a bearing therefor. It also passes thru the walls 11 and 12 and a nut 18 may be threaded on the end of the screw to clamp it firmly and prevent its rotation.

The handle 6 has a downwardly projecting threaded boss 19 thru which the elongated screw 20 passes. The inner end of the screw is loosely attached to the knife carrier 10 at 21, whereby to move the holder and knife longitudinally of the handle. The screw 20 has a knob 22 secured to its outer end by which it may be rotated.

The arms 7 and 8 each has its end turned back, as at 23 and spaced away to provide means for supporting a roller 24. A pin 25 passes thru the arm and the turned back portion to provide bearing support for the roller. The roller has an annular shoulder 26 intervening between the larger part 27 and the smaller part 28. The shoulder and larger part of the roller are to be located below the rim 29 depending from the top of a can. This prevents the rollers from being moved upwardly out of contact with the can.

The knife 15 is held in place by the screw 16 so that the screw may be removed and a new knife substituted should the old one be damaged or worn out.

The rollers, knife and screw 20 are in the same horizontal plane so that there is no distortion of parts while the device is in use as the thrust is in a direct line.

The operation of the device is very simple and easily understood.

The device is placed on the top of a can with the shoulders 26 of the rollers below the rim of the top. The screw 20 is now rotated to bring the knife into contact with the can and until it slightly penetrates the can. The device and can are then relatively rotated. This operation removes the entire top from the can and leaves only the edge of the cylinder wall without anything extending inwardly thereof.

If desired a knife or knives 15 may be substituted for one or both of the knifeless rollers 24; in the event that three knives are used only one-third revolution of the knife device about the can will be necessary to entirely sever the end of the can. This will add something to the cost of the device and require a little more power to operate it, but such modification is within the spirit of my invention.

Having described my invention what I claim as new and desire to secure by Letters Patent, is:—

A can opener comprising a slotted frame, a pair of spaced rollers on one end of the frame, each roller having an annular shoulder to lie close under the head rim of a can, a U-shaped knife carrier slidable in said slot toward and from said rollers, a rotatable knife mounted between the arms of said carrier, and a screw to move said knife and carrier toward and from said rollers, the cutting edge of said knife, its screw and the face of the shoulders on said rollers being in a common plane.

In testimony whereof I hereunto set my hand.

PHILIP G. LUBER.